Aug. 19, 1952     D. H. RANSOM ET AL     2,607,910
BATTERY CHARGING SYSTEM
Filed Jan. 17, 1951
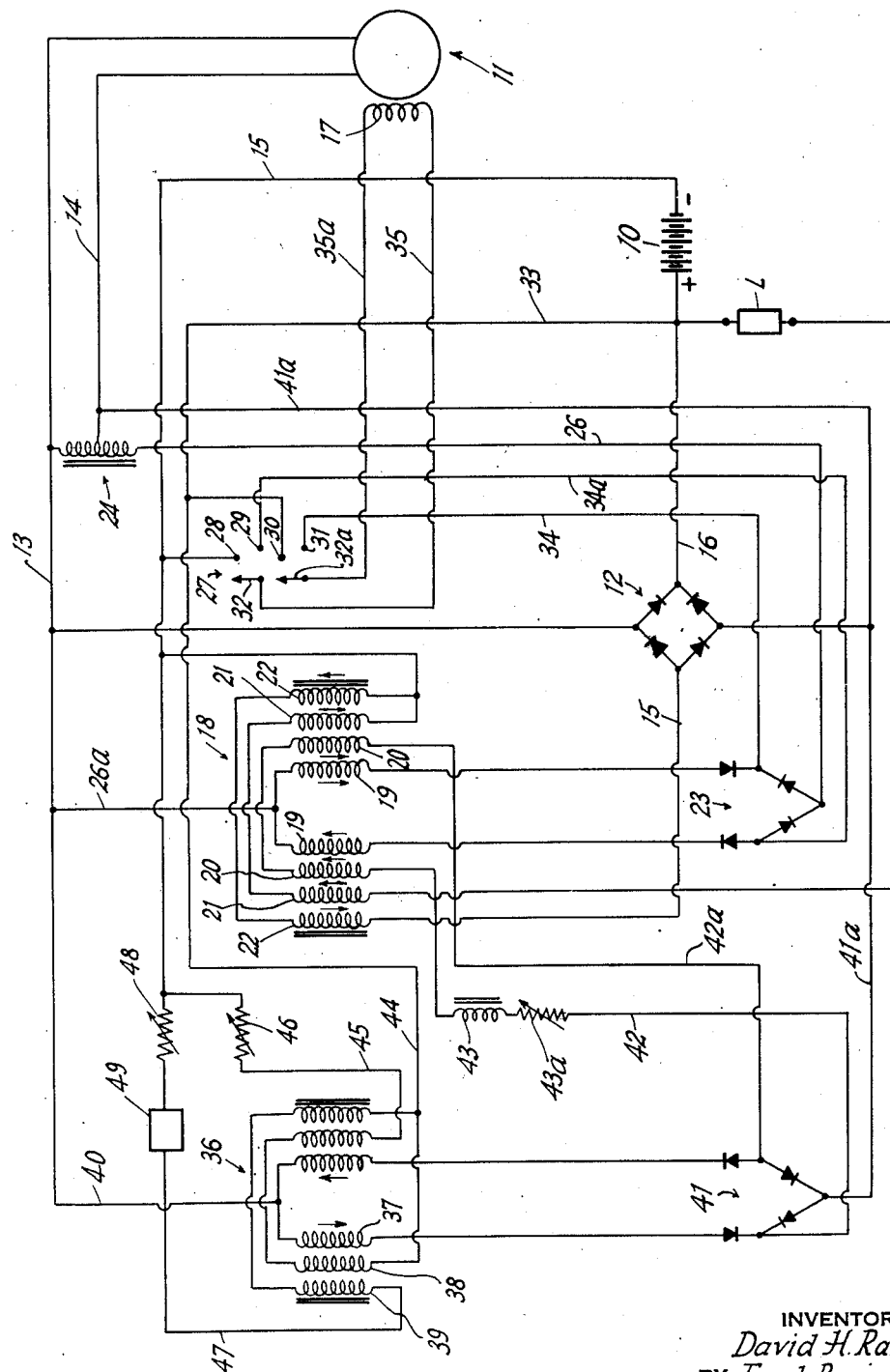
INVENTORS
*David H. Ransom*
BY *Fred Benjamin*
*Philip G. Hilbert*
ATTORNEY Patented Aug. 19, 1952

2,607,910

UNITED STATES PATENT OFFICE 2,607,910

BATTERY CHARGING SYSTEM

David H. Ransom, Pines Lake, and Fred Benjamin, Fair Lawn, N. J., assignors, by mesne assignments, to Reconstruction Finance Corporation, New York, N. Y., a corporation of the United States Application January 17, 1951, Serial No. 206,354

9 Claims. (Cl. 320—32)

This invention relates to a battery charging system.

In battery charging systems, an alternating current supply is preferred, inasmuch as the brushes and commutator of a direct current generator present a number of operational and maintenance problems. However, with alternating current generators operating at variable frequencies, it is difficult to maintain a balance or predetermined relationship between the current input to the battery and the current input to the load. Accordingly, an object of this invention is to provide a system of the character described which includes static means for regulating the operation of the generator over a wide range of frequencies to maintain said current relationships.

Another object of this invention is to provide in a system of the character described, means for sensing the current in the input circuits to the battery and load and responsive to variations in such currents, to regulate the current input to the generator field winding.

A further object of this invention is to provide in a system of the character described, improved means for regulating the current supplied to the generator field winding together with means for sensing fluctuations in the battery voltage and adapted to modify the operation of the regulating means to provide a voltage increment of the proper magnitude and direction whereby to restore the battery voltage to a normal value.

Other objects of this invention will in part be obvious and in part hereinafter pointed out.

The invention accordingly consists in the combination of elements and interconnection of parts, which will be exemplified in the system hereinafter described, and of which the scope of invention will be indicated in the claims following.

In the drawing:

The figure is a circuit diagram of a battery charging system embodying the invention.

Referring in detail to the drawing, 10 designates a storage battery which is in circuit with a load L and a variable frequency alternating current generator 11. The generator may have a frequency ranging between 200 and 1400 cycles per second. The output of generator 11 is connected to the input side of a full wave rectifier 12, by means of conductors 13, 14. The output of rectifier 12 is supplied to battery 10 by means of conductors 15, 16.

It is desirable that a predetermined relationship be maintained between the current input to the battery and the current input to the load, regardless of the frequency of generator 11. Accordingly, means is provided for regulating the output of the generator 11. Such means comprises a reactor 18 which is in circuit with the field winding 17 of the generator and the output thereof.

The reactor 18 comprises a suitable magnetic core on which is wound a pair of parallel connected power windings 19 and pairs of series connected control windings 20, 21 and 22.

Control windings 21 are adapted to sense the current input to load L and are accordingly connected between one side of the load and the negative side of the battery 10, the other side of the load being connected to the positive side of the battery.

Control windings 22 are adapted to sense the current input to the battery 10 and are accordingly inserted in the conductor 15. Control windings 20 are provided for the purpose hereinafter appearing.

The free ends of power windings 19 are connected to one side of the input of a rectifier 23. The other side of the rectifier input is connected to one side of the generator output through an autotransformer 24. The output of generator 11 is supplied to transformer 24 through conductors 13, 14. The output of transformer 24 is connected on one side to rectifier 23 by means of conductor 26 and on the other side to the juncture of windings 19 by means of conductors 13 and 26a.

The output of the rectifier 23 is supplied to the generator field winding 17, through a double pole, double throw switch 27. The switch 27 comprises pairs of fixed contacts 28, 29; 30, 31 and movable contacts 32, 32a. Contact 28 is connected to the negative side of battery 10 through conductor 15. Contact 30 is connected to the positive side of the battery through conductor 33. The contacts 29, 31 are connected to the output of rectifier 23 through conductors 34, 34a. The movable contacts 32, 32a are connected to the generator field winding 17 through conductors 35, 35a.

The operation of generator 11 is also regulated in accordance with voltage fluctuations in battery 10. To this end there is provided a reactor 36. The reactor 36 comprises a suitable magnetic core on which is disposed a pair of parallel connected power windings 37, a pair of series connected control windings 38 and a pair of series connected bias windings 39.

The power windings 37 are connected at their juncture to one side of the generator output through a conductor 40 interconnecting conductor 13. The free ends of windings 37 are connected to one side of the input of a rectifier 41, the other side of the rectifier input being connected to the other side of the generator output through a conductor 41a interconnecting conductor 14. The output of rectifier 41 is connected to the control windings 20 of reactor 18, through conductors 42, 42a. A series connected reactor 43 and resistor 43a are interposed in conductor 42.

Control windings 38 are connected on one side to the positive side of battery 10 through a conductor 44 interconnected to conductor 33. The other side of windings 38 is connected to the negative side of the battery through a conductor 45 interconnected to conductor 15. A resistor 46 is interposed in conductor 45.

One side of the bias windings 39 is connected to the negative side of the battery through a conductor 47 interconnected to conductor 15 and having a series connected resistor 48 and a non-linear impedance 49 interposed in the conductor. The other side of windings 39 is connected to the positive side of battery 10 through conductor 44.

In operating the system, the switch 27 is normally in an open position, disconnecting the reactors 18, 36 from the field winding 17. When the generator 11 has been started, the switch 27 is operated to first engage the contacts 28, 30, whereby the field winding is immediately energized directly from the battery 10. Thereafter, the contacts 29, 31 are engaged whereby the field winding is controllably energized by the output of the generator.

Control windings 21, 22 are arranged to regulate the output of the reactor 18, being responsive to current conditions in the load and battery circuits, to maintain a predetermined relationship between the respective current inputs, at any frequency of the generator.

In addition, the reactor 36 is adapted to modify the operation of reactor 18, through control windings 38. Windings 38 are arranged to sense deviations in battery voltage. An increase in battery voltage will effect a modification in the output of reactor 36 which is supplied to the control windings 20 of reactor 18 and thus reducing the output thereof and thereby regulating the operation of the generator 11 to restore the battery voltage to normal. Similarly, a decrease in battery voltage will have the effect of increasing the output of reactor 18, thereby increasing the excitation of the field winding 17, to allow the generator 11 to bring the battery to normal voltage.

The bias windings 39, together with resistor 48 provide means for setting the system to operate with respect to a given normal battery voltage.

The non-linear impedance 49 may take the form of an iron wire sealed in a glass tube which is filled with a gas having a high heat conductivity. Such impedance in circuit with bias winding 39 provides a stable reference source in relation to the linear resistor 46 in circuit with control winding 38.

The reactor or choke 43 is adapted to filter harmonics from the input to control windings 20 of reactor 18, while resistor 43a is set to stabilize the output.

It will thus be seen that there is provided a battery charging system in which the several objects of the invention are achieved.

As various possible embodiments might be made of the above described invention, and as various changes might be made in the embodiment set forth, it is understood that all matter herein set forth or shown in the accompanying drawing, is to be interpreted as illustrative and not in a limiting sense.

Having thus described our invention, we claim as new and desire to protect by Letters Patent:

1. In combination, a variable frequency alternating current generator, a storage battery, a load in circuit with said battery, rectifying means in circuit with said generator and said battery, and reactor means including a winding in circuit with the field winding of said generator, a second winding for sensing the current input to the battery, a third winding for sensing the current input to the load, said second and third windings being arranged to control the operation of said first winding whereby to regulate the output of said generator, and a fourth winding, and means in circuit with said fourth winding and said battery operable in response to voltage fluctuations of said battery to modify the regulation of the generator output.

2. In combination, a variable frequency alternating current generator, a storage battery, a load in circuit with said battery, rectifying means in circuit with said generator and said battery, means for maintaining a predetermined relationship between the current input to the battery and the current input to the load at any frequency of the generator, said means comprising a reactor having inputs connected to said battery and load circuits respectively, and switch means for successively connecting the field winding of said generator to said battery and the output of said reactor.

3. In combination, a variable frequency alternating current generator, a storage battery, a load in circuit with said battery, rectifying means in circuit with said generator and said battery, reactor means comprising a power winding and a plurality of control windings, said power windings being connected between the generator output and the generator field winding, one of said control windings being connected in circuit between said load and said battery to sense the current in said circuit, and another control windings being connected in circuit between said rectifying means and said battery to sense the current in said last mentioned circuit, said control windings being operable to regulate the current output of said power winding.

4. In combination, an alternating current generator, a storage battery, a load in circuit with said battery, rectifying means in circuit with said generator and said battery, reactor means including a plurality of control windings for regulating the input to the field winding of said generator, one of said control windings being connected between said load and said battery, and another of said control windings being connected between said rectifying means and said battery, and means responsive to variations in battery voltage for modifying the operation of said reactor means.

5. The combination as set out in claim 4, wherein said last mentioned means comprises a second reactor means including a winding in circuit with a third control winding on said first mentioned reactor means and a pair of windings connected across said battery in reverse relation to each other.

6. In combination, an alternating current generator having a field winding, a storage battery, a load in circuit with said battery, rectifying means in circuit with the output of said generator and said battery, reactor means including a power winding and a plurality of control windings, rectifier means in circuit with said power winding and said field winding, one of said control windings being series connected between said first mentioned rectifying means and said battery, another of said control windings being series connected between said battery and said load, said control windings being operative to regulate the output of said power winding in response to current variations in said load and battery circuits.

7. The combination as in claim 6, said reactor means including a third control winding, a second reactor means including a power winding and a control winding and a bias winding, rectifying means in circuit with said last mentioned power winding and the last mentioned winding of said first reactor means, the control and bias windings of said second reactor means being connected across said battery.

8. The combination as in claim 7, and including an impedance connected in series with said bias winding.

9. The combination as in claim 7, and including means for filtering the input to the third control winding of the first reactor means.

DAVID H. RANSOM.
FRED BENJAMIN.

REFERENCES CITED

The following references are of record in the file of this patent:

UNITED STATES PATENTS

| Number | Name | Date |
|---|---|---|
| 760,714 | Turbayne | May 24, 1904 |
| 1,916,307 | Gilson | July 4, 1933 |
| 1,995,637 | Day | Mar. 26, 1935 |
| 1,995,652 | Reichard | Mar. 26, 1935 |
| 2,114,827 | Aggers | Apr. 19, 1938 |
| 2,306,998 | Claesson | Dec. 29, 1942 |
| 2,373,383 | Christopher | Apr. 10, 1945 |
| 2,502,692 | Albrand | Apr. 4, 1950 |
| 2,519,650 | Hamilton | Aug. 22, 1950 |
| 2,523,472 | Leathers | Sept. 26, 1950 |
| 2,557,298 | Leece et al. | June 19, 1951 |